W. E. HOSCH.
DIFFERENTIAL WINDING AND MEASURING MACHINE.
APPLICATION FILED APR. 24, 1916.
1,228,022.
Patented May 29, 1917.
4 SHEETS—SHEET 1.
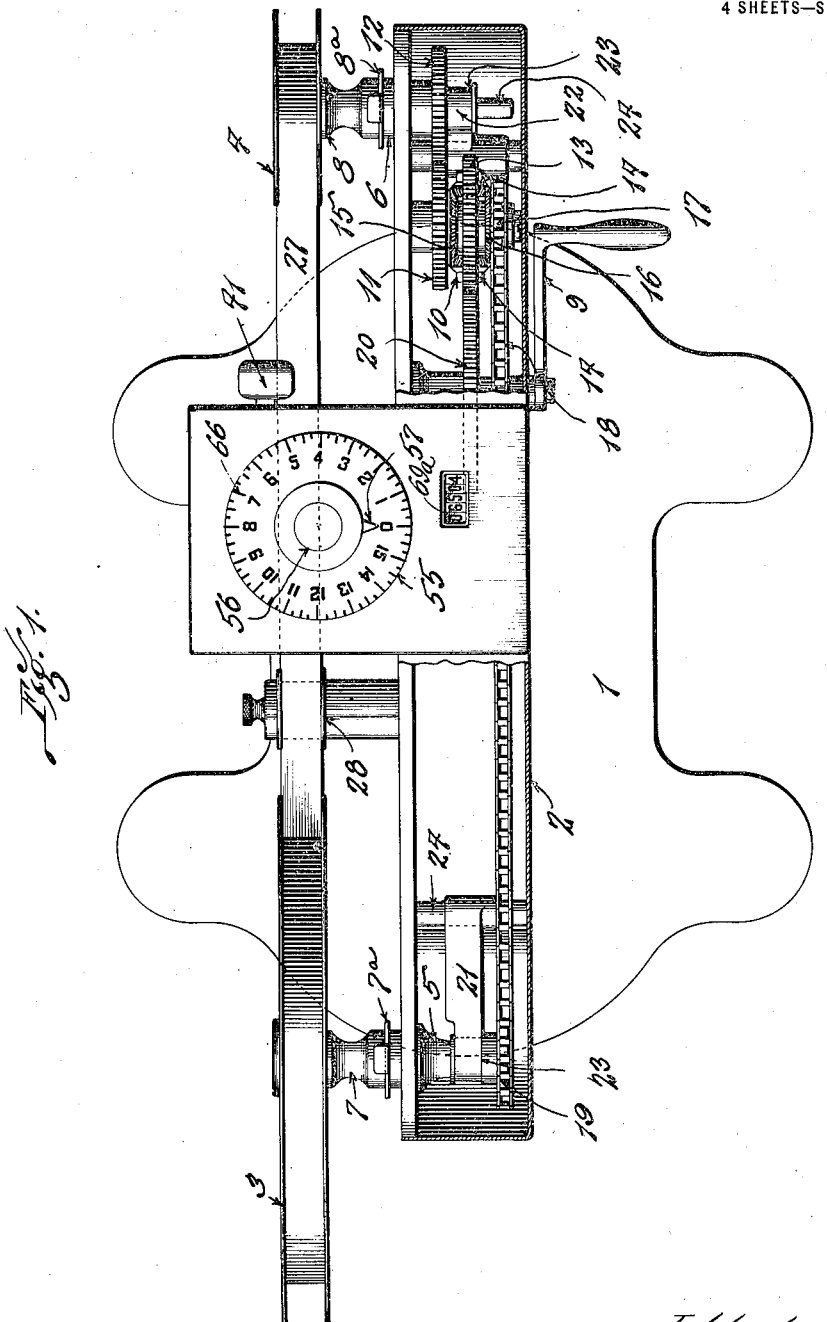

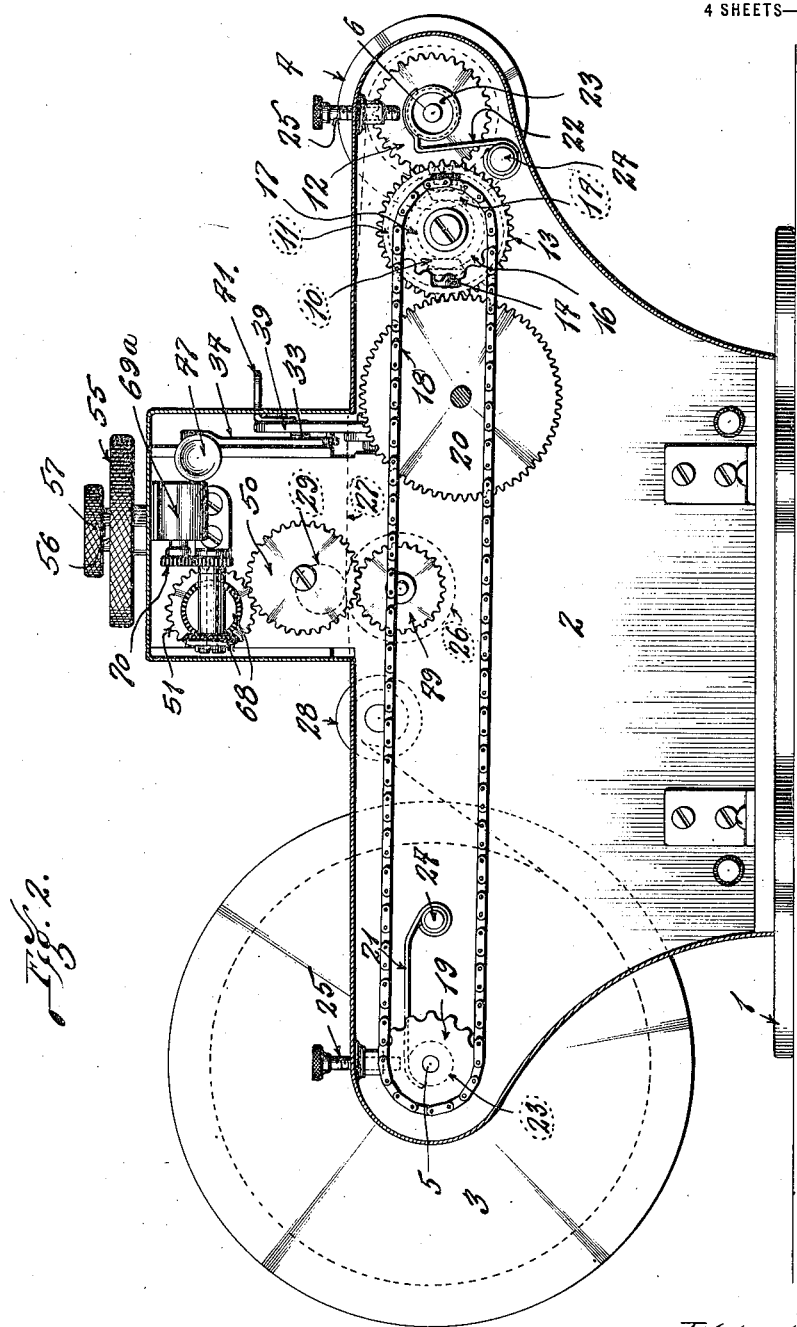

W. E. HOSCH.
DIFFERENTIAL WINDING AND MEASURING MACHINE.
APPLICATION FILED APR. 24, 1916.
1,228,022.
Patented May 29, 1917.
4 SHEETS—SHEET 3.
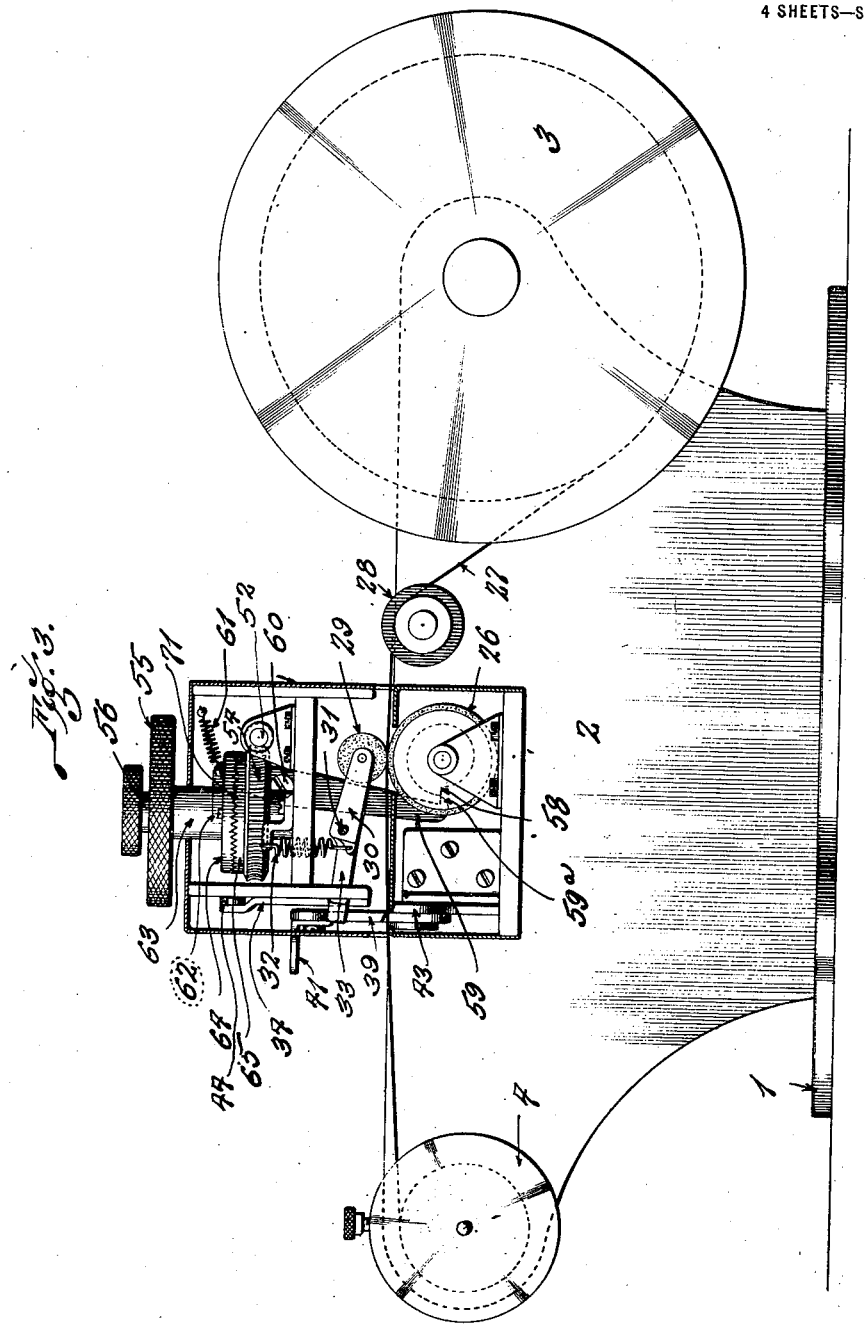
INVENTOR:
Walter E. Hosch

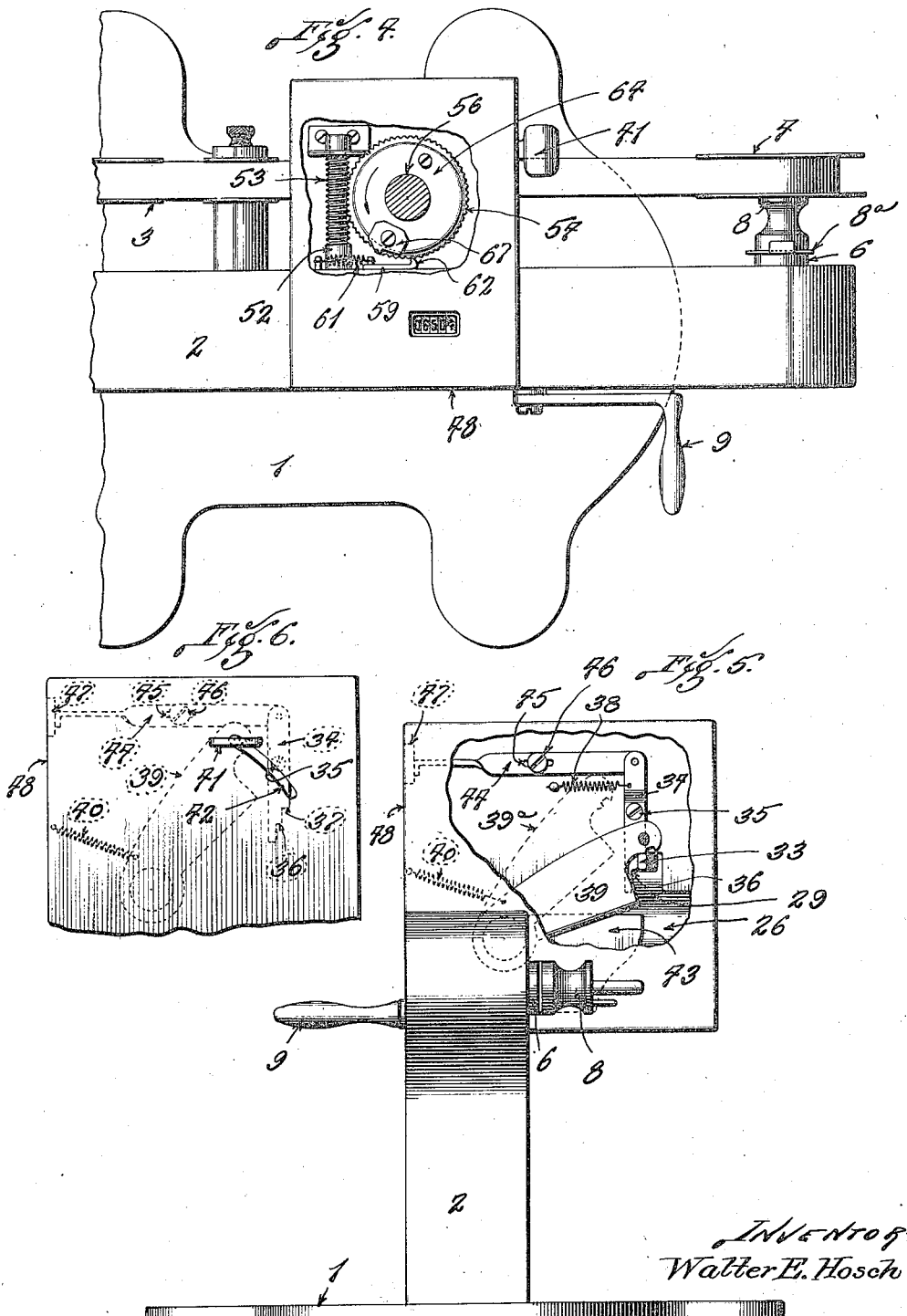

UNITED STATES PATENT OFFICE.

WALTER E. HOSCH, OF ST. LOUIS, MISSOURI.

DIFFERENTIAL WINDING AND MEASURING MACHINE.

1,228,022.     Specification of Letters Patent.     Patented May 29, 1917.

Application filed April 24, 1916. Serial No. 93,123.

*To all whom it may concern:*

Be it known that I, WALTER E. HOSCH, a citizen of the United States, residing in the city of St. Louis and State of Missouri, have invented new and useful Improvements in Differential Winding and Measuring Machines, of which the following is a specification.

This invention relates to machines for winding webs of any kind upon web-holders, such as spools or reels. The invention contemplates the use of two rotary members or spindles which respectively carry the spools, upon which the web may be wound or coiled. The general object of the invention is to provide means for enabling these rotary members to be driven by mechanism which will enable the web to be run in either direction between the spools without tending to form a slack in the web and without subjecting the web to undue tension. One of my objects is to overcome a common defect generally inherent in machines for this purpose which arises from the fact that the diameter of the coil of web on the holders or spools is constantly changing. My improvement in this respect renders the invention especially valuable when applied to measuring machines for the reason that such machines usually operate to advance the measuring apparatus through the medium of frictional contact of the advancing web with a measuring roller. With my invention, by reason of the fact that a substantially constant tension is maintained at all times in the web, a very accurately indicated measurement results. One of my objects is to provide means for enabling both of the rotary members to be positively driven, but at a complementary angular velocity, thereby enabling the winding-up web-holder to take up all the slack which the other web-holder or supply holder will give to it. It is also an object of the invention to provide such a construction as will enable the web readily to be run in either direction, without necessitating any substantial changes in the organization of the parts of the machine. The invention is particularly useful in a machine employed for winding or unwinding tapes, films or other web form material; and in machines for delivering measured quantities of such a web. Further objects of the invention will appear hereinafter.

In the drawing—

Figure 1 is a plan of a machine embodying my invention;

Fig. 2 is a vertical section taken through the machine shown in Fig. 1;

Fig. 3 is a vertical section through the upper portion of the case of the machine, but viewing it from the opposite side from that in which it is shown in Fig. 2;

Fig. 4 is a plan of the machine, partially broken away, and further illustrating details of its construction;

Fig. 5 is an end elevation of the machine, partially broken away, and further illustrating details of the construction; and Fig. 6 is a front elevation showing the upper portion of the machine, and further illustrating the relation of the parts in the detailed construction of the machine.

The machine preferably comprises a frame including a base plate 1 which adapts it to rest upon a table or bench, and above this base plate 1 the frame includes a case 2 for inclosing the principal portion of the mechanism.

At opposite points, and at about the same level, I prefer to mount in the case a pair of supporting means for rotatably supporting two web-holders, for example, two spools 3 and 4, the former of which is relatively large and may be considered as a supply spool for supplying a length of web to a number of spools or web-holders similar to the spool 4. These supporting means are in the form of two rotatable spindles 5 and 6, which project from the side of the case (see Fig. 1) so as to permit the removable attachment of the hubs 7 and 8 of the spools or holders 3 and 4. Any suitable means may be provided for removably attaching these web-holders, such as removable keys 7ª and 8ª, which engage with coincident slots (not illustrated) formed in the spindles and the hubs.

I provide means for rotating these rotary members 5 and 6 positively but at a complementary angular or rotary velocity with respect to each other, and this is accomplished by means of a hand-actuated member such as a crank 9 operating through means, such as a differential mechanism 10 to drive the spindles. For this purpose one of the driven gear wheels 11 of the differential mechanism meshes with a gear wheel 12 on the spindle 6. Any suitable differential mechanism may be employed, for example, the simple form illustrated, in which the driving gear 13 carries radial bevel pinions 14 which mesh with bevel gear wheels 15 and 16, the former of which is rigid with the gear wheel 11 referred to above. In order to impart the differential movement to the remote rotary member 5 the bevel gear 16 is rigid with a sprocket wheel 17 about which passes an endless chain 18, the opposite end portion of which runs around a similar sprocket wheel 19 which is rigid with the spindle 5. The driving gear 13 of the differential mechanism may be rotated by the crank 9 through the medium of a large gear wheel 20, to the spindle of which the crank 9 is rigidly secured.

With a construction such as I have described it will be evident that if the crank 9 is rotated the rotary members 7 and 8 will be rotated at a complementary angular or rotary velocity, and evidently if both of these members could be turned with equal freedom they would both rotate at substantially the same angular velocity. Furthermore, if either rotary member offers slightly more resistance to rotation than the other, then the other rotary member would receive a greater amount of rotation than the resisting member. This enables the take-up or winding-on spool to take up all the web that the other spool will give it. This feature of the invention is especially valuable when applied to a machine for winding a long tape or film from a supply spool to another spool, because of the incidental large variation in the diameters of the coils on the two spools. With such a construction as this, the take-up spool moves at a higher or lower angular velocity as may be necessary. In other words, the take-up spool moves faster when it should move faster and moves slower when it should move slower; and at all times prevents the formation of any slack in the web between the two spools.

In order to offer a slight resistance to the rotation of either of the rotary members, I employ means consisting of two brake members or brakes 21, 22, which may consist of two thin metal plates which are mounted in such a way as to press lightly against the peripheries of necks 23 formed on the spindles. These brakes are most conveniently mounted on studs 24 and rest by gravity against the necks 23. I provide means such as a set screw 25 associated with each brake for pressing the same against its corresponding neck. By this means, the rotation of either of the spindles 5 or 6 can be resisted. In the operation of the machine the set screw which corresponds to the web-holder or spool from which the web is being taken off, should be tightened up to adjust the pressure of the brake. The rotation of the crank 9 drives this rotary member as well as the one which is taking up the web. The amount of tension in the web, of course, depends upon the force of the application of the brake, but it is evident that the rotary member which carries the supply holder is not simply rotated by the pull or tension in the web, but if the brake is properly adjusted, it will be positively rotated through the differential.

In order to run off measured quantities of a web or tape from a supply holder, such as the large spool 3, I employ means for indicating the amount of the web which passes a given point. To drive this mechanism, I provide a measuring roller 26, the periphery of which is in the path of and in engagement with the web 27 as it passes from one web-holder to the other. In order to guide the web past the periphery of this roller I employ guiding means, for example, a guide pulley 28 over which the web passes. I provide a presser roller 29 which, when in active operation, presses the web against the periphery of the measuring roller 26. The rollers 26 and 29 have surfaces upon which the web will develop considerable friction, and are constructed so that the passing web rotates the rollers; and evidently the amount of movement of the periphery of the roller 26 will then be substantially the same as the amount of web which is moved past the roller.

The presser roller 29 is mounted on a lever 30 (see Fig. 3) supported on a pivot pin 31 and provided with means such as a spring 32, which tends to press the roller 29 against the roller 26. I also provide means for latching the presser roller 29 in an inactive position out of contact with the roller 26. For this purpose the lever 30 has an extension or tail 33 which lies adjacent to the edge of a latch or latch lever 34, (see Figs. 5 and 6). This latch 34 is mounted on a pivot screw 35, and its lower end is formed with two notches 36 and 37 (see Fig. 6). A spring 38 attached to the latch 34 tends to hold the edge of the latch against the tail of the presser lever 30. If the presser lever 30 is lying adjacent the notch 37, it is evident that if it should be depressed beyond the notch 36 the spring 38 will cause the latch to move over, so that the notch 36 will hold down the tail end of the lever, in this way holding the presser roller 29 elevated and away from the measuring roller. The presser roller may be latched in this elevated position automatically through the movement of a cutting-off knife 39 which may be depressed by the operator of the machine when a desired quantity of the web has been run off onto the receiving spool or web holder. The knife 39 is normally held in the elevated position indicated by the dotted lines 39$^a$ (Fig. 5) by means of a spring 40. Near its outer end the knife carries a thumb plate 41 which is attached to the knife through a curved slot 42 formed in the adjacent wall of the case (see Fig. 6). Fig. 5 shows the knife in the act of cutting the web; this is accomplished by the edge of the knife coöperating with a fixed shear plate 43 across which the web passes.

In order to enable the presser lever 30 to be released when desired, the latch lever 34 is provided with a push rod 44 which may be guided by means of a slot 45 and a pin 46 passing through the slot. The outer end of this push rod has a head or push button 47 which, is countersunk in an opening in the wall 48 of the case (see Fig. 5). Evidently, if the head 47 is pressed inwardly the lower end of the latch lever 34 will swing toward the left, as viewed in Fig. 5, which will release the presser lever.

To indicate the amount of web run off, I provide the shaft of the roller 26 with a gear wheel 49 which meshes with another gear wheel 50 to transmit movement through a gear wheel 51 to an elevated counter shaft 52 Figs. 3 and 4, the middle portion of which is formed into a screw or worm 53. This worm meshes with a worm wheel 54 for rotating an indicating dial 55. This dial is rotatable around a fixed stud 56, at one point on which a fixed pointer 57 is formed or attached.

When the roller 26 is rotated, evidently its movement is transmitted to the indicating dial 55.

I provide means for effecting the measurement of a predetermined amount of the web, operating in such a way that a part of the mechanism can be set to indicate this predetermined quantity, and so constructed that other parts of the mechanism will operate automatically to arrest the measuring movement when this predetermined quantity has been run off. In order to accomplish this I provide the shaft of the measuring roller 26 with a tooth or shoulder 58, coöperating with which I provide a stop or detent 59 having a hook or tooth 59ª which may project into the path of the tooth or shoulder 58 so as to stop the rotation of the measuring roller. This stop 59 is pivotally supported on a pin or pivot screw 60, and its upper end is normally pulled over by a spring 61 so that the tooth 59ª is normally out of the path of the tooth 58. Referring to Fig. 4, it will be seen that the upper end of this lever or detent 59 has a hook 62 which enables it to be pulled over at the proper moment by the rotating dial; and the moment at which this hook 62 is pulled over depends upon the position in which the dial was set before the running off of the web was begun. In order to enable the dial to be set as suggested to measure off a predetermined quantity I form the dial 55 rigid with a sleeve 63, the lower end of said sleeve being formed into a toothed clutch member 64 which coöperates with a similar clutch member 65 carried by the worm wheel 54. Evidently by sliding the dial and sleeve 63 upwardly on the stud 56 the clutch members 64 and 65 can be disengaged and then the dial can be rotated backward, that is, in a clock-wise direction. On the clutch member 64 opposite the zero point on the scale 66 there is provided a small trip or dog 67. Supposing that the dial has been set back to indicate five yards for example, it would follow, that when the dial rotates sufficiently to indicate zero at the pointer, the tooth on the dog 67 will engage the hook 62 and pull the detent or stop 59 into the path of the shoulder 58, which will stop the measuring roller. The knife may then be brought down to cut off the web.

I provide means for adding up or indicating the total lengths of web or tape which have been run off, measured, and cut off by the machine. For this purpose motion can be taken from the counter shaft 52 through the medium of bevel gears 68, Fig. 2, which drive an ordinary counter 69ª through a suitable gear connection 70.

Evidently, if it is desired to coil or wind a web from one web holder to another without affecting the indicating mechanism, this can be accomplished by winding the web across while the presser roller 29 is held elevated. If the presser roller is held elevated the web will not be pressed against the periphery of the measuring roller, and consequently the mechanism driven thereby will not be affected.

The clutch members 64 and 65 are provided with equi-distant radial, inclined clutch teeth 71, and the pitch of these teeth and their location bear a definite relation to the divisions of the scale on the dial. For example, each tooth space of the clutch may correspond with one of the small divisions or any division on the scale.

The mode of operation of the machine may be briefly stated as follows:

The rotation of the crank 9 drives the differential mechanism 10 and the driven gear 11 on one side of the differential will drive the spindle 6. The sprocket wheel 17, which is driven by the other side of the differential will drive the chain 18 to communicate rotary movement to the other spindle.

By rotating the crank in one direction and by tightening up the proper brake screw the web can be drawn off from one of the spools and wound upon the other; the web, of course, is drawn off from the spool, the brake of which is applied. By reversing the brake condition, that is, by releasing that brake and tightening the other brake and then rotating the crank 9 in the opposite direction the machine will operate to run the web in the opposite direction. Evidently, the machine operates to wind the web with equal facility in both directions. If it is not desired to measure the amount of web passing between the spools the presser roller 29 is held elevated. When it is desired to measure the amount of web the head or push button 47 is pushed inwardly, which releases the presser roller and lets it descend upon the measuring roller. When measuring, of course, the web must be run in a direction which will advance the indicator reading. As the web moves past the measuring roller it rotates the roller frictionally so that the peripheral movement of the roller is the same as the linear advance of the web. The rotation of the measuring roller is transmitted through the clutch members 64 and 65 to the dial 55. By raising the dial 55 the clutch members 64 and 65 can be disengaged and the dial set to enable the machine to stop automatically after measuring the amount indicated by the dial. When the dial has been set in this way, at the expiration of the required movement of the dial the dog 67, carried by the clutch member 64 engages hook 62 and swings over the stop lever 59 so that its tooth 59ª stops the rotation of the measuring roller. If it is desired to run off a relatively large quantity of the web, the dial member 55 with clutch member 64 should be removed altogether, otherwise the machine would stop automatically at every revolution of the dial. The actuation of the cutting knife automatically throws the presser roller out of contact with the measuring roller 26, but the presser roller will descend automatically upon the measuring roller, if the push button 47 is pressed.

It is understood that the embodiment of the invention set forth herein is only one of the many embodiments the invention may take, and I do not wish to be limited in the practice of my invention, nor in my claims to the particular embodiment set forth.

What I claim is:—

1. In a machine of the class described, the combination of two rotatable supporting means to carry two web-holders in order to pass the web from one holder to the other, and means for positively driving both of said supporting means at complementary rotary velocities as the web unwinds from one of said holders and winds upon the other, to compensate for the changing diameter of the coil of the web upon each holder.

2. In a machine of the class described, the combination of two rotatable supporting means to carry two web-holders in order to pass the web from one holder to the other, and differential driving mechanism for positively driving both of said supporting means at complementary rotary velocities as the web unwinds from one of said holders and winds upon the other, to compensate for the changing diameter of the coil of the web upon each holder.

3. In a machine of the class described, the combination of two rotary members constructed to carry respectively and rotate two web-holders, in order to pass the web from one holder to the other, differential driving mechanism for driving both of said rotary members at complementary rotary velocities to compensate for the changing diameter of the coil of the web on each holder in winding the web from one holder to the other, and hand actuated means for driving said differential mechanism.

4. In a machine of the class described, the combination of two rotary members constructed to carry respectively and rotate two web-holders, in order to pass the web from one holder to the other, differential driving mechanism for driving both of the said rotary members at complementary rotary velocities to compensate for the changing diameter of the coil of web on each holder in winding the web from one holder to the other, hand actuated means for driving said differential mechanism, and means for maintaining tension in the web.

5. In a machine of the class described, the combination of rotary members constructed to carry respectively and rotate two web-holders in order to pass the web from one holder to the other, differential driving mechanism for driving both of the said rotary members at complementary rotary velocities, and means for resisting the rotation of the rotary member carrying the spool from which the web is uncoiling to maintain a tension in the web as it passes between the web-holders.

6. In a machine of the class described, the combination of rotary members constructed to carry respectively and rotate two web-holders, in order to pass the web from one holder to the other, a hand actuated driving member, means independent of the web and mounted at a fixed point for driving either of said rotary members by said hand actuated member to pass the web from either of the web-holders to the other, and tension means for maintaining tension in the web.

7. In a machine of the class described, the combination of rotary members constructed to carry respectively and rotate two web-holders, in order to pass the web from one holder to the other, a hand actuated driving member, means independent of the web and mounted at a fixed point for driving either of said rotary members by said hand actuated member to pass the web from either of the web-holders to the other, tension means for maintaining tension in the web, and means for adjusting the tension means.

8. In a machine of the class described, the combination of two rotary members constructed to carry respectively, and rotate two web-holders in order to pass the web from one holder to the other, a measuring roller mounted with its periphery in the path of the web so as to be engaged and rotated by the passing web, differential mechanism for driving said rotary members at complementary rotary velocities, and measuring means for indicating the amount of peripheral movement of said measuring roller.

9. In a machine of the class described, the combination of two rotary members constructed to carry respectively, and rotate two web-holders, in order to pass the web from one holder to the other, a measuring roller mounted with its periphery in the path of the web so as to be engaged and rotated by the passing web, differential mechanism for driving said rotary members at complementary rotary velocities, means for indicating the amount of peripheral movement of said measuring roller, and means associated with said measuring roller for effecting the measurement of a predetermined quantity.

10. In a machine of the class described, the combination of two rotary members constructed to carry respectively, and rotate two web-holders in order to pass the web from one holder to the other, a measuring roller mounted with its periphery in the path of the web so as to be engaged and rotated by the passing web, differential mechanism for driving said rotary members at complementary rotary velocities, means for indicating the amount of peripheral movement of said measuring roller, means associated with said measuring roller for effecting the measurement of a predetermined quantity, and means for maintaining tension in said web as it passes over said measuring roller.

11. In a machine of the class described, the combination of two rotary members constructed to carry respectively, and rotate two web-holders in order to pass the web from one holder to the other, a measuring roller mounted with its periphery in the path of the web so as to be engaged and rotated by the passing web, differential mechanism for driving said rotary members at complementary rotary velocities, means for measuring the amount of peripheral movement of said roller, a stop for arresting the measuring movement, and mechanism constructed to be set to different indicated quantities for regulating the moment of operation of said stop.

12. In a machine of the class described, the combination of two rotary members constructed to carry respectively, and rotate two web-holders in order to pass the web from one holder to the other, a measuring roller mounted with its periphery in the path of the web so as to be engaged and rotated by the passing web, differential mechanism for driving said rotary members at complementary rotary velocities, measuring means for indicating the amount of peripheral movement of said measuring roller, means for effecting the measurement of predetermined quantities of the web, and means for indicating the total of the said quantities measured.

13. In a machine of the class described, the combination of two rotary members constructed to carry respectively and rotate two web-holders in order to pass the web from one holder to the other, means for guiding the web between the web-holders, differential driving mechanism for driving either of said rotary members in a direction to wind the web onto its web-holder and simultaneously drive the other rotary member in a direction to unwind the web from its corresponding web-holder, and means associated with each of said rotary members for resisting the rotation thereof when the web is being drawn away from it and thereby producing tension in the web as it passes between the web-holders.

In testimony whereof, I have hereunto set my hand.

WALTER E. HOSCH.